Patented Aug. 14, 1945

2,382,802

UNITED STATES PATENT OFFICE

2,382,802

EMULSION COPOLYMERIZATION OF BUTADIENE-1,3 HYDROCARBONS AND MONOVINYL COMPOUNDS COPOLYMERIZABLE THEREWITH

William E. Messer, Cheshire, Conn., assignor to United States Rubber Company, New York, N. Y., a corporation of New Jersey No Drawing. Application February 3, 1942, Serial No. 429,389

14 Claims. (Cl. 260—84.5)

This invention relates to improvements in the emulsion copolymerization of butadiene-1,3 hydrocarbons and monovinyl compounds copolymerizable therewith.

An object is to provide means for securing good yields of high quality synthetic rubber at relatively low temperatures and in a relatively short reaction time from the emulsion polymerization of butadiene-1,3 hydrocarbons such as butadiene-1,3 and monovinyl compounds such as styrene. Other objects will be apparent from the following description.

In the emulsion copolymerization of a butadiene-1,3 hydrocarbon and a vinyl compound as for instance butadiene-1,3 and styrene, a poor yield is obtained at low temperatures unless the reaction time is excessively long. In any case, the product will be hard to work and will be much inferior to natural rubber. Many compounds have been added to modify or regulate the reaction; some shorten the reaction time but produce too soft products; others give soft products but in poor yields. I have found that naphthyl mercaptans as the added regulator give an excellent rubber in good yield. The naphthyl mercaptan may be added before or during the copolymerization. The amount of naphthyl mercaptan used is usually from 1 to 2 parts by weight, based on 100 parts of the polymerizable compounds, although larger or smaller amounts may be employed.

Other butadiene-1,3-hydrocarbons may be copolymerized with styrene or other monovinyl compounds such as acrylonitrile, using a naphthyl mercaptan as the added regulator with advantages similar to those mentioned above.

The following examples are given in illustration of the invention, the parts being by weight:

Example 1

Seventy-five (75) parts of butadiene and 25 parts of styrene having dissolved therein 1.25 parts of beta-naphthyl mecaptan are emulsified in a solution of 7.3 parts of ordinary soap, 0.29 part of ammonium persulfate (or equivalent of (.04 part) of hydrogen peroxide) and 200 parts of water. This aqueous alkaline emulsion is gently agitated to maintain the preformed emulsion and heated for about 16–20 hours at about 40–45° C. The product consists of a stable latex which may be treated with antioxidants and further treated by any suitable means (such as steam distillation) to remove any unreacted raw materials. The latex is then flocculated by any suitable means (as by adding a suitable salt solution) and the floc washed and dried, and amounts to about 70 parts by weight. This floc may be sheeted out on a rubber mill and compounded, etc., as desired. A typical cure of a tire tread stock compound made from this material and mold cured for 60 minutes at 45 pounds per square inch steam pressure gave a breaking tensile strength of 3,000 pounds per square inch, an elongation of 700 per cent and a set of 20. When the same procedure as above is repeated omitting the beta naphthyl mercaptan some 30–40 parts of polymer are obtained and this has a tensile, elongation and set of around 1500—500—10, and poor abrasion.

Example 2

The procedure in Example 1 is repeated except that 1.25 parts of alpha-naphthyl mercaptan are substituted for the beta-naphthyl mercaptan. If polymerization conditions are the same, then about 65 parts by weight of polymer will be obtained. This when compounded in a tread stock and mold cured at 45 pounds per square inch steam for 60 minutes gave a tensile, elongation and set of 2800—650—25, high plasticity and fair abrasion. When the procedure of Example 2 is repeated omitting alpha naphthyl mercaptan, then poor yields of poor quality are obtained.

The invention is not limited to the specific polymerization formula and conditions shown in the examples; the proportion of the butadiene and the vinyl compound may be varied; also other butadiene-1,3 hydrocarbons, such as isoprene, may be used in place of butadiene-1,3; also mixtures containing one or more of the butadiene-1,3 hydrocarbons and one or more of the monovinyl compounds may be used.

The synthetic rubber of the invention may be used along or in combination with natural rubber or other synthetic rubbers to give vulcanized rubber articles such as tires, tubes, footwear, etc.

The invention is also not limited to the accelerators and antioxidants and compounding ingredients used in forming the vulcanizates.

Having thus described my invention, what I claim and desire to protect by Letters Patent is:

1. In the copolymerization of an aqueous emulsion containing a butadiene-1,3 hydrocarbon and a mono-vinyl compound copolymerizable therewith, with the aid of a polymerization catalyst, the step of carrying out the polymerization in the presence of an unsubstituted naphthyl mono-mercaptan, the butadiene-1,3 hydrocarbon constituting a major proportion of the polymerizable material.

2. In the copolymerization of an aqueous alkaline emulsion containing butadiene-1,3 and a mono-vinyl compound copolymerizable therewith, with the aid of a polymerization catalyst, the step of carrying out the polymerization in the presence of an unsubstituted naphthyl mono-mercaptan, the butadiene-1,3 constituting a major proportion of the polymerizable material.

3. A method which comprises subjecting an aqueous alkaline emulsion containing a butadiene-1,3 hydrocarbon and a mono-vinyl compound copolymerizable therewith, to agitation and polymerization in the presence of a small amount of an unsubstituted naphthyl mono-mercaptan, the butadiene-1,3 hydrocarbon constituting a major proportion of the polymerizable material.

4. A method which comprises subjecting an aqueous alkaline emulsion containing butadiene-1,3 and a mono-vinyl compound copolymerizable therewith, to agitation and polymerization in the presence of a small amount of alpha-naphthyl mercaptan, the butadiene-1,3 constituting a major proportion of the polymerizable material.

5. A method which comprises subjecting an aqueous alkaline emulsion containing butadiene-1,3 and a mono-vinyl compound copolymerizable therewith, to agitation and polymerization in the presence of a small amount of beta-naphthyl mercaptan, the butadiene-1,3 constituting a major proportion of the polymerizable material.

6. In the copolymerization of an aqueous emulsion containing butadiene-1,3 and acrylonitrile with the aid of a polymerization catalyst, the butadiene-1,3 being present in amount greater than the acrylonitrile, the step of carrying out the polymerization in the presence of an unsubstituted naphthyl mono-mercaptan.

7. In the copolymerization of an aqueous emulsion containing butadiene-1,3 and styrene with the aid of a polymerization catalyst, the butadiene-1,3 being present in amount greater than the styrene, the step of carrying out the polymerization in the presence of an unsubstituted naphthyl mono-mercaptan.

8. In the copolymerization of an aqueous emulsion containing butadiene-1,3 and acrylonitrile with the aid of a polymerization catalyst, the butadiene-1,3 being present in amount greater than the acrylonitrile, the step of carrying out the polymerization in the presence of alpha naphthyl mercaptan.

9. In the copolymerization of an aqueous emulsion containing butadiene-1,3 and styrene with the aid of a polymerization catalyst, the butadiene-1,3 being present in amount greater than the styrene, the step of carrying out the polymerization in the presence of beta-naphthyl mercaptan.

10. In the copolymerization of an aqueous emulsion containing butadiene-1,3 and styrene with the aid of a polymerization catalyst, the butadiene-1,3 being present in amount greater than the styrene, the step of carrying out the polymerization in the presence of alpha naphthyl mercaptan.

11. A method which comprises subjecting an aqueous alkaline emulsion containing, based on the total polymerizable material, about .75 parts by weight of butadiene-1,3 and about 25 parts by weight of styrene, to agitation and polymerization in the presence of a small amount of an unsubstituted naphthyl mono-mercaptan.

12. A method which comprises subjecting an aqueous alkaline emulsion containing, based on the total polymerizable material, about 75 parts by weight of butadiene-1,3 and about 25 parts by weight of styrene, to agitation and polymerization in the presence of a small amount of alpha-naphthyl mercaptan.

13. A method which comprises subjecting an aqueous alkaline emulsion containing, based on the total polymerizable material, about 75 parts by weight of butadiene-1,3 and about 25 parts by weight of styrene, to agitation and polymerization in the presence of a small amount of beta-naphthyl mercaptan.

14. A method which comprises subjecting an aqueous alkaline emulsion containing, based on the total polymerizable material, about 75 parts by weight of butadiene-1,3 and about 25 parts by weight of acrylonitrile, to agitation and polymerization in the presence of a small amount of an unsubstituted naphthyl mono-mercaptan.

WILLIAM E. MESSER.